Dec. 18, 1928.  1,695,750
R. H. WHITELEY
LUBRICATING DEVICE
Filed May 2, 1928  2 Sheets-Sheet 1
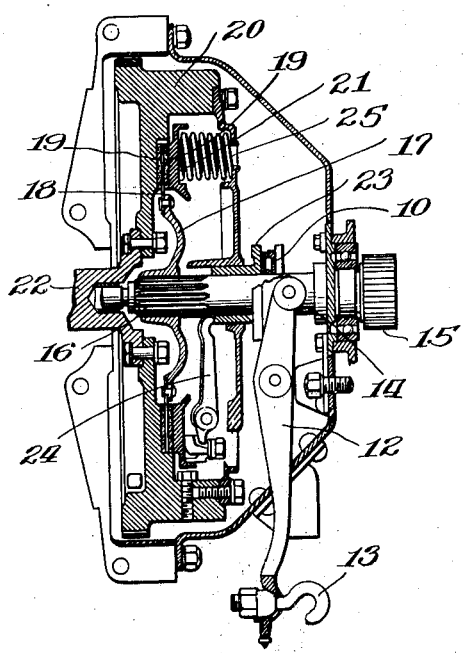
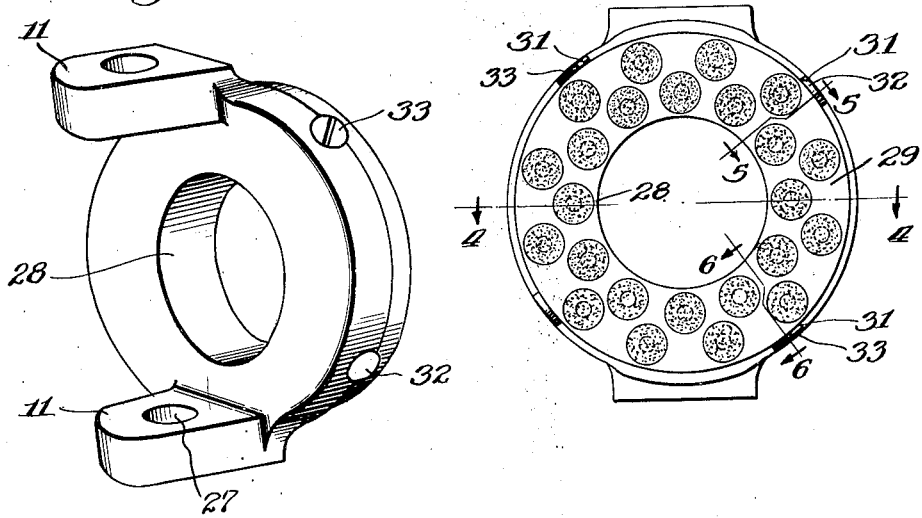
Inventor
Robert H. Whiteley
By Williams, Bradbury, McCaleb & Hinkle
Attys.

Dec. 18, 1928.
R. H. WHITELEY
1,695,750
LUBRICATING DEVICE
Filed May 2, 1928      2 Sheets-Sheet 2
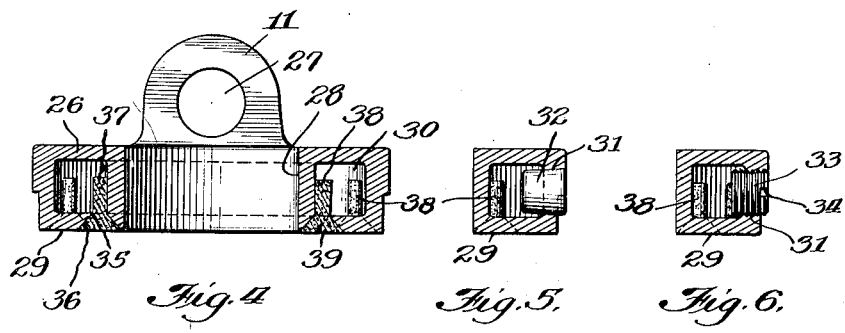
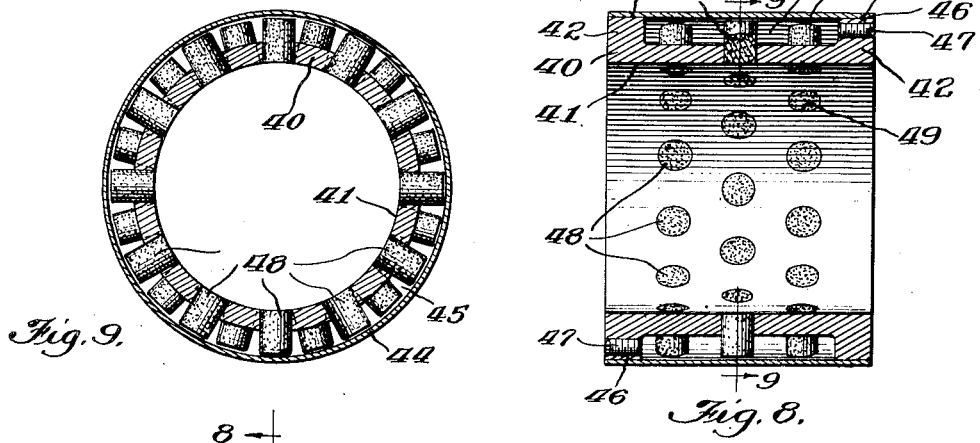
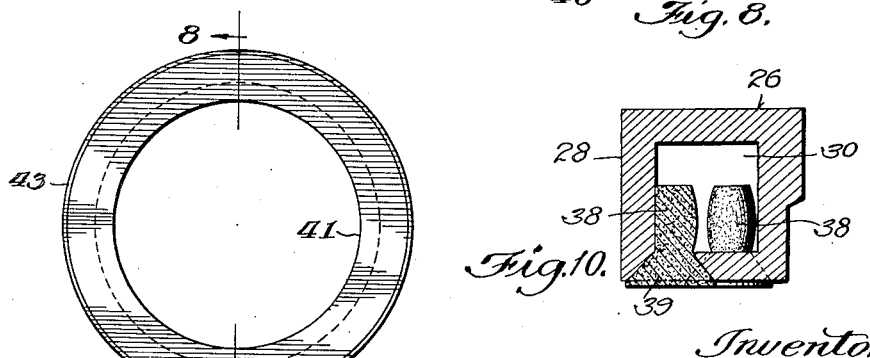
Inventor
Robert H. Whiteley
By Williams, Bradbury, McCaleb & Hinkle
Attys.

Patented Dec. 18, 1928.

1,695,750

UNITED STATES PATENT OFFICE.

ROBERT H. WHITELEY, OF OAK PARK, ILLINOIS, ASSIGNOR TO HIMSELF AS TRUSTEE.

LUBRICATING DEVICE.

Application filed May 2, 1928. Serial No. 274,410.

The present invention relates to lubricating devices and is particularly concerned with the provision of a self-lubricating bearing.

My invention is of particular importance in connection with bearings which are relatively inaccessible for the purpose of ordinary lubrication, and for this reason the embodiment which I have chosen to illustrate the invention is a clutch throw-out collar. However, I desire it to be understood that my invention is of universal application and may be employed in bearings of the standard type shown in the modification and for frictionally engaging surfaces of any type.

One of the objects of the present invention is the provision of a unitary self-lubricating member which is capable of receiving a supply of ordinary lubricant and dispensing the same over the bearing surfaces during a relatively long period of time without further attention and without the possibility of lubricant reaching other parts not intended to be lubricated.

Another object of the invention is the provision of a unitary self-lubricating bearing having a reservoir for lubricant formed or contained therein and having a bearing face with a plurality of plugs of material capable of transferring lubricant to the bearing face by capillary attraction and of dispensing the same over the bearing surface without waste or excess of lubrication.

Other objects and advantages of my invention will appear more fully from the following description and from the accompanying drawings, in which similar characters of reference indicate similar parts throughout the several views.

Referring to the drawings, of which there are two sheets,

Fig. 1 is an elevational view in partial medial longitudinal section of a standard clutch equipped with one of my self-lubricating throw-out collars;

Fig. 2 is a front elevational view of my self-lubricating throw-out collar;

Fig. 3 is a rear view in perspective of the same;

Fig. 4 is a cross sectional view taken on the line 4—4 of Fig. 2;

Fig. 5 is a similar cross sectional view taken on the line 5—5 of Fig. 2;

Fig. 6 is a similar view taken on the line 6—6 of Fig. 2;

Fig. 7 is an elevational view of an ordinary cylindrical bearing constructed according to the present invention;

Fig. 8 is a longitudinal sectional view taken on the line 8—8 of Fig. 7;

Fig. 9 is a view in partial cross section taken on the line 9—9 of Fig. 8.

Fig. 10 is a sectional view of one portion of the clutch collar taken on the line 4—4 of Fig. 2 on an enlarged scale.

Referring to Fig. 1, I have here illustrated a conventional clutch for showing the use of my self-lubricating clutch throw-out collar. In this figure, 10 indicates in its entirety my clutch throw-out collar which is provided with a pair of rearwardly extending lugs 11 adapted to be pivotally secured to a forked clutch lever 12 which is operatively connected to the clutch pedal by a hook 13 located at its lower end. The throw-out collar 10 is mounted for free rotation upon the stub shaft 14 which is provided with a pinion 15 for engagement with the transmission gears, and with a plurality of keys or guides 16 for slidably supporting a clutch hub 17 which is adapted to rotate the shaft 14.

The clutch hub supports at its outer edge the friction disc 18 which is adapted to be engaged by friction rings 19 carried by the fly wheel 20 and by the clutch pressure plate 21. The shaft 22 is operatively connected with the motor and the clutch is adapted to connect the shaft 22 to the shaft 14 by means of the friction disk 18 and friction rings 19. When the clutch lever 12 is rotated in a counter-clockwise direction the throw-out collar is moved to the left in Fig. 1, sliding the clutch sleeve 23 on the shaft 14 and rotating a plurality of clutch pressure levers in a counter-clockwise direction. The clutch pressure levers engage beneath the outer edge of the clutch pressure plate and draw the friction ring 19 out of engagement with the friction disk 18 against the tension of the springs 25.

During this motion the clutch throw-out collar 10 presses against the clutch sleeve 23, and as the clutch sleeve 23 rotates with the shaft 14, there is relative rotation between the sleeve 23 and the face of the throw-out collar 10. This bearing surface being located within the clutch casing, it is accessible only with difficulty and it is not desirable that the surface be accessible for lubrication by ordinary methods, because any slight excess of lubricant would soon be thrown off the parts of the clutch with the possibility that lubricant would reach the friction discs and friction rings which are not intended to be lubricated. The possibility of lubricant applied to this bearing getting upon the friction discs and rings with consequent slip of the clutch has heretofore induced manufacturers to neglect entirely the lubrication of this throw-out collar, with resultant squeaking and wearing of the parts.

I have discovered that the ordinary initially plastic compounds of graphite, of the kind heretofore used in so-called "oil-less" bearings, for glazing the bearing surface by spreading the compound over the surface to fill the pores and interstices, which compounds may be purchased upon the open market, have the property of conducting lubricant by capillary attraction and when used in conjunction with the combinations of elements disclosed in the present application, are capable of maintaining a bearing surface moist with just sufficient lubricant to keep the bearing properly lubricated, and without leaving any excess of lubricant to be thrown off the bearing by centrifugal action.

I shall now describe several embodiments of my invention, which are capable of utilizing this property of capillary attraction as well as other properties of the plastic compounds mentioned.

Referring to Figs. 2 to 6, my throw-out collar may be of substantially the conventional form, consisting of an annular ring 26 of substantially rectangular cross section and provided with a pair of backwardly extending lugs 11 having apertures 27 adapted to be engaged by the pivots upon the clutch lever 12. The exterior shape of the throw-out collar is of no particular importance, but the collar is preferably provided with a central bore 28 adapted to receive the shaft 14 and with a forward, flat, annular surface 29 adapted to engage a flange of similar form upon the clutch sleeve 23.

In order to provide my self-lubricating bearing with a continuous supply of lubricant, the throw-out collar is preferably formed with a reservoir 30 therein and in the present case the reservoir may be of substantially annular form, the reservoir having a substantially rectangular cross section at any point with rounded corners for convenience in casting. In the operation of casting, this reservoir may be formed by supporting a core within the mold and a plurality of pins are employed for supporting the core, thereby leaving a plurality of apertures 31 in the outer cylindrical surface of the collar. All but two of the apertures 31 are preferably permanently closed by driving therein tapered metal plugs 32 which are in close frictional engagement with the walls of the apertures 31, and the two remaining apertures may be threaded and closed with threaded plugs 33 having a kerf 34 to permit their removal by a screw driver. The removable plugs 33 are preferably located at diametrically opposite points in order to permit cleaning of the reservoir or filling of the reservoir in spite of the presence of air therein.

My throw-out collar is preferably provided with a plurality of plugs of initially plastic graphite compound extending from the reservoir 30 to the bearing face 29 and capable of transferring lubricant to said face by capillary attraction.

The plugs or lubricating members may be staggered and located so that their exposed ends will lubricate the bearing surface between the respective plugs.

The initially plastic graphite compound may be pressed into conduits in the throw-out collar in a plastic condition to conform to and fit itself within said conduits and this plastic compound thus forms a plug in intimate contact with the walls of its conduit. When the initially plastic plugs of graphite compound are set in place, they are secured in a manner which makes them more permanent and serviceable than any other graphite material. For this purpose, a plurality of small apertures 35 may be provided in the face 29 of the bearing and these apertures are preferably staggered as shown in Fig. 2 and countersunk or tapered as at 36 to form a headed plug 37. The apertures 35 may be filled by forcing therein sufficient plastic graphite compound to fill the countersunk portion 36 and to project a stem 38 into the reservoir 30, and it will thus be observed that a plurality of plugs 37 may be formed having exterior heads 39 which cover a substantial area of the bearing face and having interior portions 38 which may be slightly enlarged forming a clincher (see Fig. 10) within the reservoir and thereby retaining the plugs permanently within the bearing. The provision of heads on the lubricating members increases the area of lubrication without increasing the size of the conduits to such an extent that the structure would be weakened. I do not wish to be limited, however, to the specific form of capillary bodies shown, as many modified forms may be made without departing from the spirit of the invention.

Referring to Figs. 7 to 9, I have here illustrated a standard type of cylindrical bearing which may be constructed by forming a metal member 40 having a cylindrical bore 41 and a pair of outwardly projecting flanges 42. The flanges 42 are provided with narrow outer cylindrical surfaces 43 and a sheet metal sleeve 44 of steel or other appropriate metal may be shrunk upon the member 40, thereby closing the space between the flanges 42 to form an annular chamber 45.

In order to provide access to the chamber 45, flanges 42 may be provided with threaded apertures 46, preferably located at diametrically opposite points on opposite sides of the bearing and the apertures 46 may be closed with similar screw plugs 47.

In the present type of bearing, I prefer to form the capillary plugs 48 by merely providing a plurality of rows of staggered bores extending from the inside bearing surface 41 into the reservoir 45, and by pressing into these bores sufficient initially plastic graphite compound to form cylindrical plugs 48. It is, of course, understood that the bores 49 are formed before the ring 44 is shrunk upon the bearing.

In each of the embodiments illustrated, the graphite bodies are preferably formed in such manner that they project slightly from the face of the bearing, (Fig. 10) and when the bearing is first used or worn in, these projecting portions of graphite are spread over the surface of the bearing by engagement with the complementary contacting surface, thereby filling all the small irregularities of the finished bearing and producing a surface which is smoother than a bearing formed by ordinary methods. This smooth graphited surface has the property of operation with less friction and is capable of being lubricated with less lubricant than other bearings. As a consequence, there is less heating of the bearing and the lubricant used is maintained in a more viscous condition, thereby reducing the amount of lubricant used and greatly prolonging the time during which the bearing may be employed without further attention. After the bearing has been worn in, the graphite bodies appear as shown in the illustrations, substantially flush with the surface of the bearing.

The operation of my self-lubricating bearing is as follows. The reservoir 45 may be filled with ordinary lubricant of any type, such as light oil or heavy grease, and this lubricant will be conducted by capillary attraction through the plugs 37 or 48 to that portion of the plug adjacent the bearing surfaces. No more lubricant is used than is just necessary to keep the surface of the bearing properly lubricated, and there is no excess of lubricant to be thrown off by centrifugal action. Due to the continuous supply of lubricant in extremely small quantities, my self-lubricating bearing is capable of operation for extremely long periods of time without further attention and should the supply of oil or grease be exhausted, the graphite, of which the plugs are formed, has the property of itself reducing friction for a further long period of time.

While I have illustrated and described specific embodiments of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a self-lubricating bearing, the combination of a bearing member having a metallic body formed with a reservoir therein, a bearing surface on said bearing member, said member having a conduit therein from said reservoir to said bearing surface and a lubricating member in said conduit consisting of initially plastic graphite compound pressed into said conduit in a plastic condition to conform to and fit itself within said conduit, said graphite compound being set in said conduit in intimate contact with the walls thereof, and said lubricating member being formed with an exterior head embedded in said lubricating surface.

2. In a self-lubricating bearing, the combination of a bearing member having a metallic body formed with a reservoir therein, a bearing surface on said bearing member, said member having a conduit therein from said reservoir to said bearing surface and a lubricating member in said conduit consisting of initially plastic graphite compound pressed into said conduit in a plastic condition to conform to and fit itself within said conduit, said graphite compound being set in said conduit in intimate contact with the walls thereof, and said lubricating member being intruded into said reservoir to form clinchers having increased lubricant absorbing surface.

3. In a self-lubricating bearing, the combination of a bearing member having a metallic body formed with a reservoir therein, a bearing surface on said bearing member, said member having a conduit therein from said reservoir to said bearing surface and a lubricating member in said conduit consisting of initially plastic graphite compound pressed into said conduit in a plastic condition to conform to and fit itself within said conduit, said graphite compound being set in said conduit in intimate contact with the walls thereof, and said lubricating member having an initially protruding portion adapted to fill the pores and interstices of said bearing surface.

4. In a self lubricating clutch collar, the combination of a bearing member having a metallic body formed with a reservoir, a thrust bearing surface on said bearing member having conduits therein from said reservoir to said bearing surface, and lubricating members in said conduits consisting of initially plastic graphite compound pressed into said conduits in a plastic condition to conform to and fit within said conduits, said graphite compound being set in said conduit in intimate contact with the walls thereof, and said lubricating members being staggered and located to lubricate the bearing surface between said lubricating members.

In witness whereof, I hereunto subscribe my name this 28th day of April, 1928.

ROBERT H. WHITELEY.